INVENTOR
G. L. HEMINGER
BY [signature]
ATTORNEY

INVENTOR
G. L. HEMINGER
BY [signature]
ATTORNEY

INVENTOR
G.L.HEMINGER
BY
ATTORNEY

INVENTOR
G. L. HEMINGER
BY [signature]
ATTORNEY

United States Patent Office 3,166,736
Patented Jan. 19, 1965

3,166,736

DATA SENSING APPARATUS INCLUDING MEANS FOR REPLACING INCORRECT OR OUTMODED DATA

George L. Heminger, Cicero, Ill., assignor to Western Electric Company, Incorporated, New York, N.Y., a corporation of New York Filed Aug. 25, 1960, Ser. No. 51,872
3 Claims. (Cl. 340—172.5)

This invention relates to a method and apparatus for processing data, and more particularly to a method and apparatus wherein a control signal is generated automatically upon the recalling of specific, predetermined data. It is an object of the invention to provide an improved method and apparatus of this character.

In accordance with the preferred embodiment of the invention, the invention is applied to data processing apparatus wherein a keyboard may be employed for encoding intelligence for storage in data storing means, such as punched tape, and wherein data sensing means, such as a tape recoder, may be employed as an alternative source of data to be transmitted to the same storing means. In this preferred embodiment and application of the invention, the data recalled by the sensing means, in addition to being fed into the storing means may also be fed to the keyboard, which may be preset to correspond to certain preselected data. When and if the data sensing means reads and forwards to the keyboard signals corresponding to that preselected data, a control signal is produced which serves to interrupt operation of the sensing means.

In such an embodiment and application of the invention, a preselected bit of stored data may be singled out for any desired treatment. For example, where a bit of data known to be incorrect or outmoded is stored on a medium which permits a sequential recalling of data, the above-referred to embodiment of the invention may be employed to permit effective correction of the data. More specifically, a punched tape known to have a data bit which is incorrect or, for any reason, should be changed, may be copied in order to produce a corrected tape, the present invention providing for interrupting the copying of the tape when the data bit is recalled which is to be changed.

Accordingly, it is another object of the invention to provide an improved method and apparatus wherein operation of data recalling apparatus is interrupted upon the feeding thereby of a preselected data bit to a keyboard preset in correspondence with that data bit, which keyboard may alternatively be employed to encode intelligence for storing in data storing means.

It is a further object of the invention to provide an improved method and apparatus of processing data wherein data may be stored upon being encoded by a keyboard and passed to data storing means, and wherein data recalling means may feed selected data through said keyboard, preset to correspond to that selected data, to interrupting means for interrupting operation of the apparatus.

It is a still further object of the invention to provide an improved method and apparatus for processing data wherein selectively settable data encoding circuitry may be conditioned to encode intelligence in data signals for storing in data storing means, and may be alternatively conditioned to transmit recalled data signals, to which said circuitry has been selectively set, from data sensing means to interrupting means for interrupting machine operation.

A further object of the invention is to provide an improved method and apparatus for processing data having various of the characteristics specified above while readily permitting the use of conventional data processing methods and apparatus.

A still further object of the invention is to provide an improved method and apparatus of processing data having various of the characteristics prescribed above while being inherently reliable and efficient in operation and economical in construction and operation.

Other objects and advantages of the invention will become apparent by reference to the following description and the accompanying drawings illustrating a preferred embodiment thereof, in which.

Figure 1:
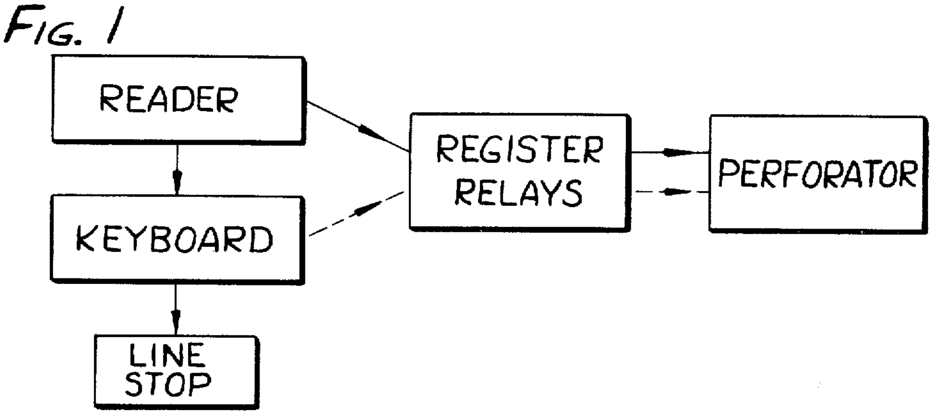
FIG. 1 is a block diagram illustrating the flow of signals between the major portions of data processing apparatus incorporating the present invention.

In accordance with the preferred embodiment of the invention illustrated in the drawings, the invention is applied to data processing apparatus employing punched tape. As is suggested by the dashed flow lines in the block diagram of FIG. 1, a keyboard is arranged to encode intelligence into data signals which are passed to a tape perforator through a network of register relays. As indicated by the solid flow lines of FIG. 1, an automatic tape reader may also transmit data signals to the tape perforator through the register relays. Since the automatic tape reader and the perforator may be of conventional and well-known form and do not of themselves constitute features of the present invention, they are not disclosed in detail herein. Further, in connection with the tape perforator, it should be noted that it is illustrated in the drawings merely as responding to operation of the register relays. In the drawings and in the ensuing description, the flow of the data signals is carried only to the register relays. It will be obvious to those skilled in the art that selective actuation of these control relays may readily effect the desired operation of the tape perforator.

Further in connection with FIG. 1, it will be seen that the automatic tape reader also directs a signal to the keyboard. As has been indicated above, the keyboard may be preset in accordance with preselected data. When the data signals from the reader correspond to the setting of the keyboard, a signal is passed from or through the keyboard to interrupting means which interrupt operation of the machine. In the illustrated embodiment of the invention, the interrupting means are termed "line stop" because the reader simultaneously reads an entire line on the punched tape and transmits the corresponding signals to the keyboard, these signals causing operation of the line stop, provided that the keyboard has been preset in accordance with that specific data. The function of the line stop is, therefore, to stop operation of the machine with the desired line of the punched tape in a desired position, preferably prior to copying of that line by the tape preforator. Corrected data may then be inserted on the tape which is being prepared in place of the incorrect or outmoded data on the detected line, following which the remainder of the data may be copied on the new, corrected tape.

Figure 2:
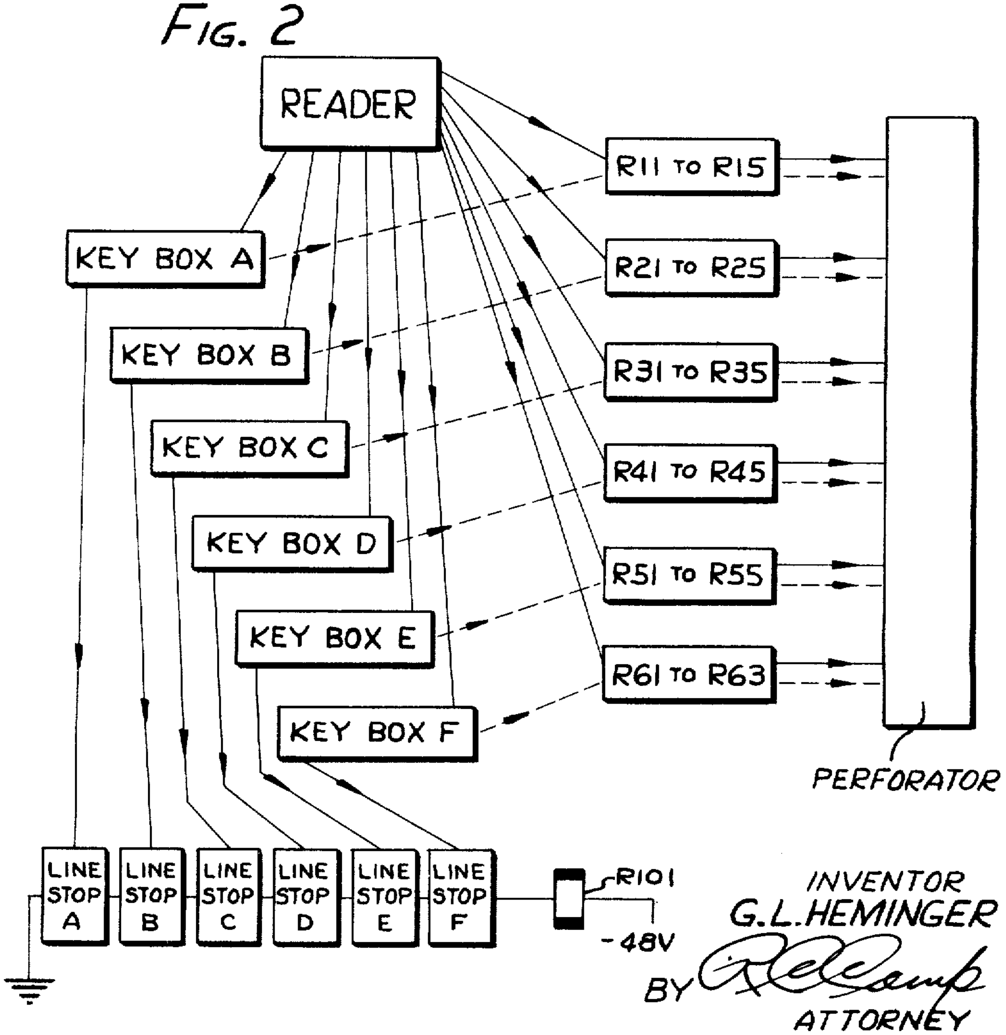
FIG. 2 is a block diagram similar to FIG. 1 but expanded to show certain portions of the apparatus broken down into six different channels or orders.

The block diagram of FIG. 2 is similar to that of FIG. 1 and is expanded to illustrate that the keyboard and the register relays are divided into channels or orders, there being line stop relay means for each channel or order of the key box and a single operation-interrupting relay for interrupting machine operation when all of the line stop relay means are actuated. The automatic tape reader and the tape perforator are similarly divided into channels or orders. However, since these two devices may be conventional in form and are not shown or described in detail herein, they have not been broken into channels or orders in the block diagram of FIG. 2.

Figure 3:
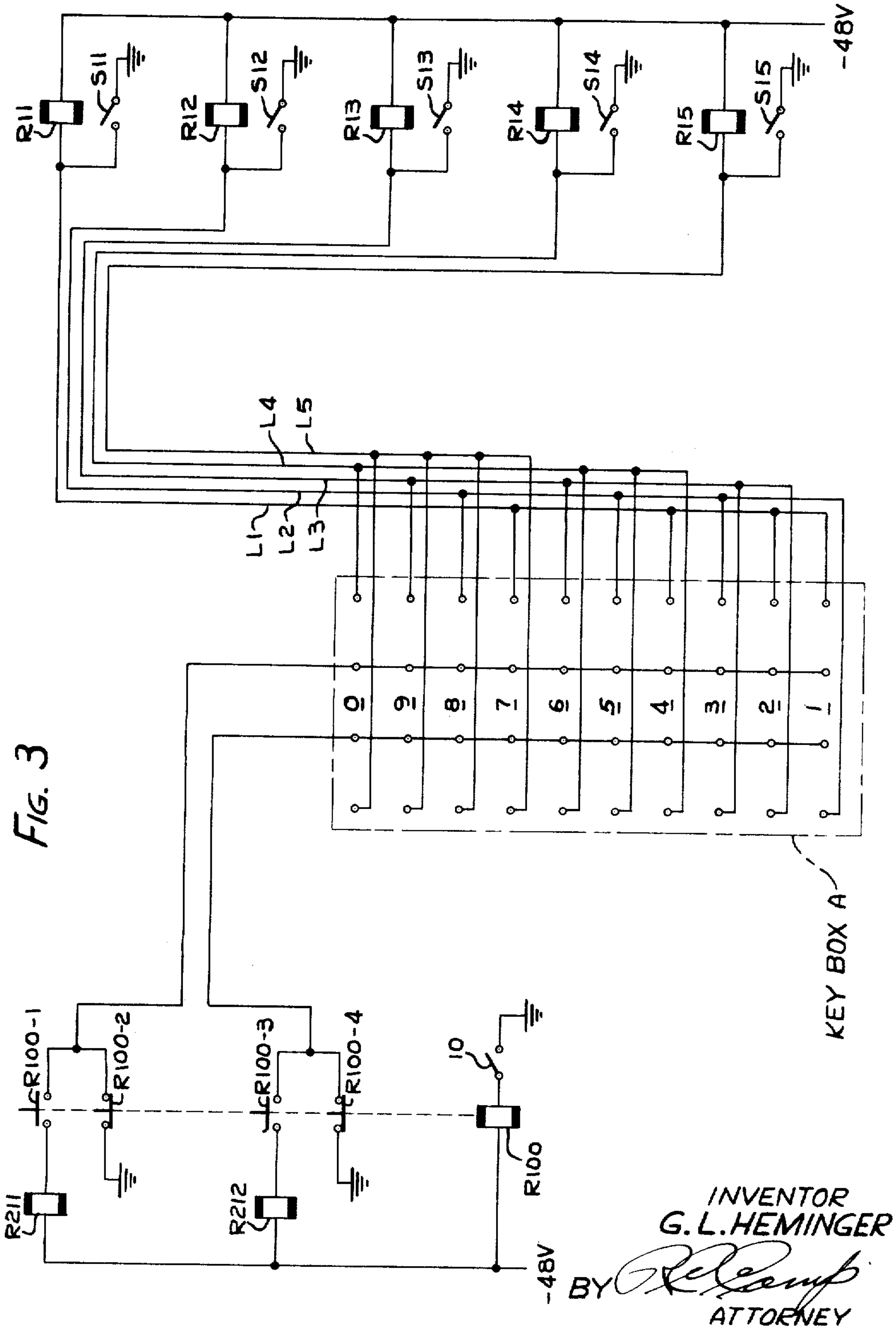
FIG. 3 is a circuit diagram illustrating one channel or order of the overall apparatus of FIGS. 1 and 2.

Turning now to the detailed circuitry of FIG. 3 for any one of the channels designated A, B, C, D and E in FIG. 2 it will be seen that a key box designated "Key Box A" is arranged to connect a pair of ground circuits at the left to any two of five register relays R11 through R15 at the right. It wil be recognized by those skilled in the art that the specific apparatus illustrated operates on the well-known two-out-of-five system wherein any two of the five relays R11 through R15 may be actuated at one time. There are ten different combinations of two energized relays whereby ten different indications may be represented by the five relays. This is a practical form for a decimal system of data processing since it is known that exactly two of the relays will be energized in each correct cycle of operation.

Figures 5, 6:
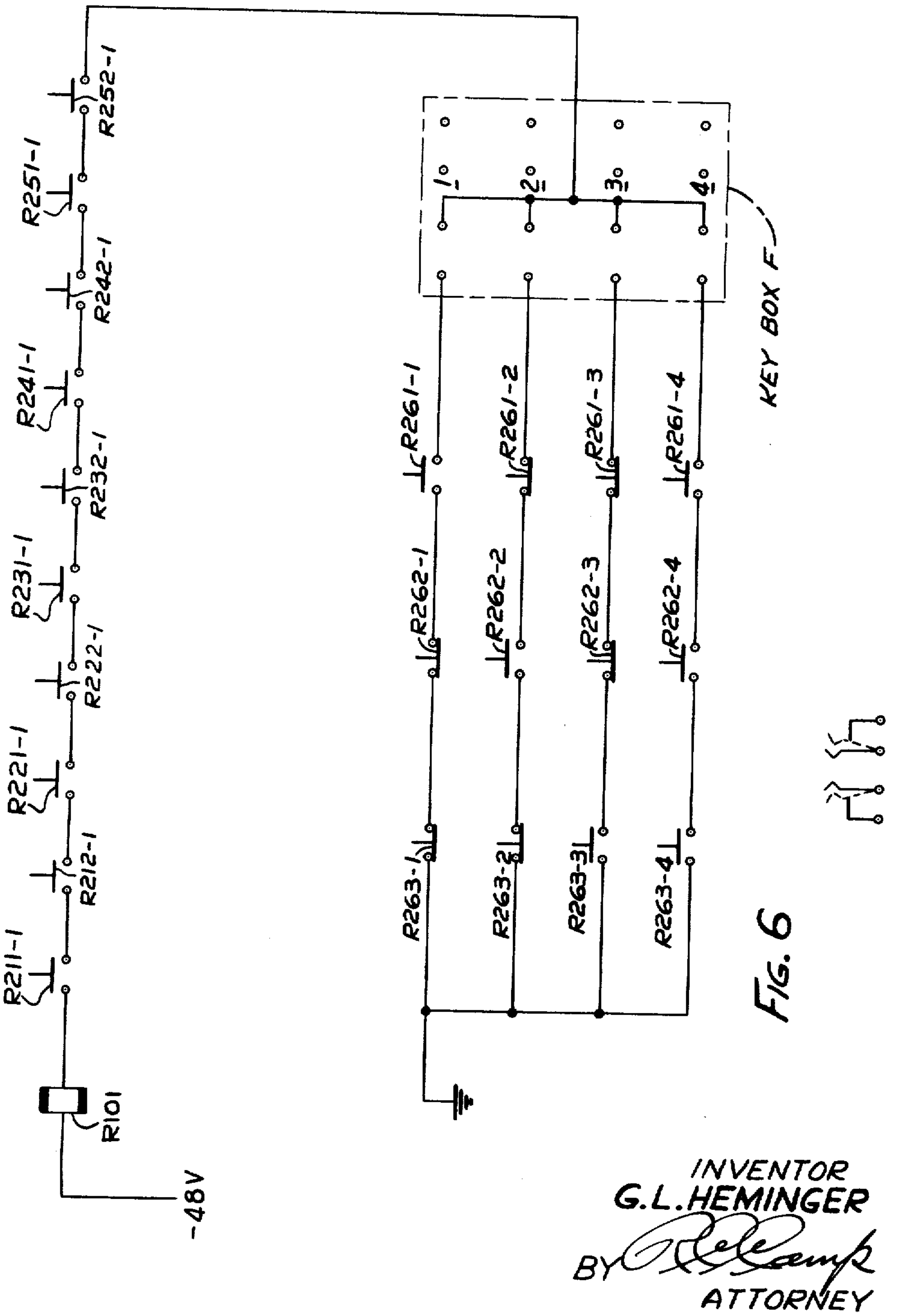
FIG. 5 is a circuit diagram showing apparatus for interrupting operation of the data processing apparatus under predetermined conditions; and, FIG. 6 is a schematic representation of a type of double pole, single throw switch employed in the circuitry of FIGS. 3 and 4.

Key Box A comprises ten double pole, single throw switches whereby the two ground circuits at the left are selectively connected to any two of five leads extending to the right to the five register relays. The form of these switches in Key Box A is shown in FIG. 6. As will be apparent to those skilled in the art, an insulating wedge inserted between the two central contacts bends them outwardly into the positions shown in phantom lines in FIG. 6 wherein they engage the two corresponding outer contacts.

The ten switches may be selectively actuated in correspondence with any one of the ten digits which it is desired to store or record on perforated tape. It will be appreciated that only one of the ten switches of Key Box A should be actuated at any one time. The ten switches and positions on the Key Box A are arbitrarily designated 1 through 9 and 0 in FIG. 3.

Tracing the circuitry controlled by Key Box A, it will be seen that ground connections at the left are connected through normally closed relay contacts R100–2 and R100–4, subsequently to be described, to the central contacts of Key Box A. If, for example, switch No. 7 of Key Box A is actuated, the lefthand central contact is connected to the adjacent outer contact, to line L5 which connects to the register relay R15, and to a 48 volt power source. The right central contact of switch No. 7 is connected to the adjacent outer contact, to line L1 which connects to register relay R11, and to the same power source. Accordingly, when switch 7 is actuated, the two ground circuits at the left are connected to register relays R11 and R15. Similarly, actuation of any one of the other nine double pole, single throw switches of Key Box A connects the same two ground circuits to a different pair of the five register relays R11 through R15 of this "A" channel.

Referring momentarily to FIG. 2, it will be appreciated that Key Box B, Key Box C, Key Box D and Key Box E are identical to Key Box A and each connects its own corresponding pair of ground circuits selectively to its own corresponding group of five register relays. The register relays for the various orders or channels are numbered as clearly shown in FIG. 2 for convenience in distinguishing between the various channels or orders. Key Box F and register relays R61 through R63 differ from the other orders and are described separately below.

Returning to FIG. 3, attention is directed to the reader switches at the righthand side of the figure designated S11, S12, S13, S14 and S15. These are individual, normally open switches which are closed to actuate the register relays when sensing pins of the reader detect perforations in a previously punched tape. The sensing pins and other details of the reader are not shown in the drawings since the necessary apparatus for actuating the switches may be conventional in form and does not of itself constitute a feature of the present invention.

For the purpose of describing the present invention, it is sufficient to understand that detection of data bits on a previously perforated tape within the automatic tape reader closes appropriate, corresponding ones of the normally open reader switches S11 through S15. As will be readily seen in FIG. 3, closure of switch S11 connects ground to the register relay R11, the other side of the register relay being connected to power as previously seen. Similarly, closure of the other reader switches S12 through S15 causes actuation of the corresponding register relays R12 through R15.

It will now be appreciated that the system is adapted to produce punched tape carrying either new data fed thereto through use of the key board, or old data copied from an existing tape through use of the tape reader. If desired, these two sources of signals for actuating the register relays R11 through R15 may be alternatively connected to and disconnected from the register relays in order that there may be no interference between the signal source circuits. However, where the reader switches are normally open, they will not interfere with operation of the register relays R11 through R15 by Key Box A and the two associated ground circuits. Similarly, if all key box switches are left open when not in use, the key box will not interfere with operation of the register relays by the automatic tape reader.

In accordance with the present invention, when the automatic tape reader advances the tape to a preselected line, and more particularly a line containing predetermined data, it is desired that the reader may be automatically stopped. In accordance with the present invention, the keyboard is employed to sense the data read by the automatic tape reader and fed to the register relays. This is accomplished by feeding the same data to the keyboard as is fed to the register relays. If the the data fed to the switchboard corresponds to the setting of the keyboard, the signals are passed through the keyboard to suitable interrupting means.

More particularly, the data received by the A channel from the automatic reader consists of the closing of any two of the five reader switches S11 through S15. The ground signal applied to the two corresponding register relays R11 through R15 by the closing of such reader switches may or may not pass through Key Box A depending upon which of the ten key box switches is closed. If, for example, reader switches S11 and S15 are closed to apply a ground signal to register relays R11 and R15, the same ground signals are applied to lines L1 and L5. If switch No. 7 of Key Box A is the closed switch (preset to detect this particular signal), the two ground circuits will be connected to the central terminals of switch No. 7.

In order that the passing of these ground signals through Key Box A may actuate suitable interrupting means, a single line stop relay R100 for the entire machine, shown at the lefthand side of FIG. 3, is energized by closing of a manual switch 10 in a manner which is readily apparent upon reference to FIG. 3. Line stop relay R100 opens the normally closed contacts R100–2 and R100–4. This opens the ground circuits which are selectively connected to the register relays R11 through R15 by Key Box A during keyboard perforation of tapes. At the same time, normally open relay contacts R100–1 and R100–3 are closed to connect the central contacts of Key Box A to stop relays R211 and R212, these relays in turn being connected to a power source as shown.

It will now be seen that if two ground signals are applied by two of the five automatic reader switches S11 through S15 to two of the five register relays R11 through R15 and to two corresponding ones of the five leads L1 through L5, these ground signals may be passed to the central contacts of Key Box A to energize the stop relays R211 and R212, provided that the line stop relay R100 has previously been energized to condition the circuits for the line stop operation and provided that the key box has been set to a value corresponding to the two ground signals. The two stop relays R211 and R212 for the A channel are incorporated in the "Line Stop A" box of FIG. 2. It is to be understood that channels B, C, D and E have stop relays R221 and R222, R231 and R232, R241 and R242, and R251 and R252, respectively. The effect of actuating these stop relays is described below following a description of the modified circuitry which is provided in connection with the special F channel.

The F channel is characterized by its having only four usable representations or indications as opposed to ten in the other channels. The apparatus is otherwise quite similar to that of FIG. 3. Key Box F of FIG. 4 serves to connect single ground circuits, shown at the left and including normally closed contacts of the line stop relay R100, to register relays R61, R62 and R63 at the right. Key Box F employs the same form of double pole, single throw switch as Key Box A and as shown in FIG. 6. For the purpose of keyboard operation of the tape perforator, however, only the two righthand contacts are employed even though the lefthand contacts are also actuated. As is clearly seen in FIG. 4, three different data bits may be recorded on a tape by the closing of any one of the first three switches of Key Box F, designated 1, 2 and 3 in FIG. 4. More particularly, closing of any one of the first three switches connects a corresponding ground circuit at the left to a corresponding register relay at the right such that the register relay is actuated.

The fourth representation available in the F channel calls for actuation of all three of the register relays. This could be accomplished through simultaneous closing of switches 1, 2 and 3 of Key Box F. In the preferred embodiment of the invention, however, this is accomplished through a fourth switch on Key Box F, the closing of which energizes an F channel gang switch relay R99 through an energizing circuit which is apparent in FIG. 4. Energization of the gang switch relay R99 closes normally open relay contacts R99-1, R99-2 and R99-3, each of which bridges and effectively closes one of the key box switches 1, 2 or 3. It will be seen that this causes energization of all three of the register relays R61, R62 and R63.

Figure 4:
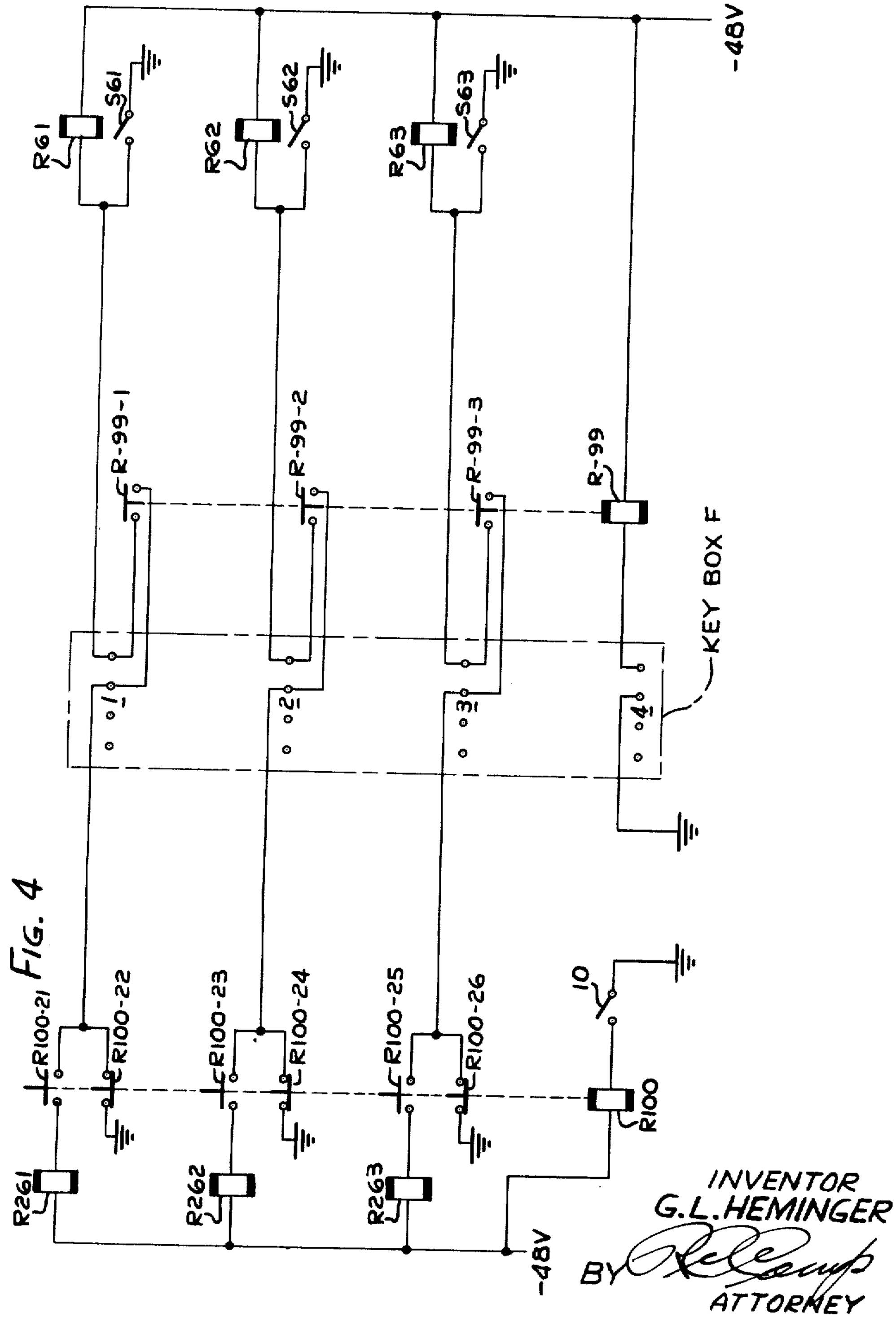
FIG. 4 is a circuit diagram similar to FIG. 3 but illustrating a specialized form of apparatus used in one channel or order of the overall apparatus of FIGS. 1 and 2.

When it is desired that the tape perforator be operated by the automatic tape reader, for example in the copying of tapes, operation of a sensing pin of the automatic tape reader for channel F closes the corresponding switch S61, S62 or S63 at the righthand side of FIG. 4. This serves to ground the corresponding register relay R61, R62 or R63. The fourth value or representation of the F channel comprises the closing of all three of the reader switches and energization of all three of the register relays.

When it is desired that the apparatus be stopped at a selected line during the copying of a punched tape, the line stop relay R100 is energized by closing the switch 10 as shown at the left in FIG. 4. This is, of course, the same line stop relay R100 and electrical switch 10 which is shown in FIG. 3 and which is discussed above, only one such relay and switch being required to condition all six channels or orders of the machine. Energizing of the line stop relay R100 opens the normally closed contacts R100-22, R100-24 and R100-26 whereby the ground circuits employed for keyboard operation of the tape perforator are broken. At the same time normally open contacts R100-21, R100-23 and R100-25 are closed, whereby the first three right central contacts of Key Box F are connected respectively to stop relays R261, R262 and R263. The key box will now pass a ground signal from any single one of the reader switches to the corresponding stop relay if the corresponding switch of the key box is closed.

However, it will be apparent that if Key Box F is preset to pass any single ground signal, the corresponding stop relay will be actuated not only when the corresponding reader switch, alone, is closed but also when all three reader switches are closed (corresponding to the fourth value of channel F). A false detection by the key box and a false interruption of machine operation would thus result. This complication is resolved by the stop circuit or interrupting means shown in FIG. 5.

Starting with the upper lefthand portion of the circuit of FIG. 5, there is shown a master stop relay R101. This relay is shown without relay contacts in the drawings since its contacts are employed in a circuit which may be conventional in form and which does not of itself constitute a feature of the present invention. Master stop relay R101 opens or closes circuits which interrupt operation of the machine, or of certain portions thereof. More particularly, it may be desired that the master stop relay 101 function to interrupt feeding of perforated tape through the automatic tape reader in order that data recorded on the preselected line may be treated in some desired manner. If, for example, it is desired that a copy of the perforated tape be made with one line altered, it will be desired that the master stop relay 101 interrupt the advance of both the master tape being copied and the new tape on which the data is being copied. Still further, it will be desired that the master stop relay 101 interrupt the perforating operation of the tape perforator prior to the recording of the data appearing on the selected line of the master tape.

All of these possible functions of the master stop relay R101, and various other possible functions of the master stop relay which might be desired, may readily be obtained through conventional circuitry which does not of itself constitute a feature of the present invention, and accordingly, need not be shown or described in detail herein. For the purpose of describing the present invention, it is believed to be sufficient to indicate that actuation of the master stop relay 101 effects some desired function shortly after the prescribed data is detected.

In order to actuate the master stop relay R101, it is necessary to complete the circuit from the indicated power source through the relay and through the various stop relay contacts to the ground connection shown at the lower left. Immediately to the right of the master stop relay are ten normally open relay contacts associated with the ten stop relays of the first five channels A through E, there being two stop relays per channel as shown in FIG. 3.

It will be noted that these ten relay contacts are simply arranged in series whereby each of the ten stop relays must be energized before the master stop relay can be energized. The two stop relays of any channel will be energized only when the one particular two-out-of-five signal for which the corresponding key box has been preset is received from the automatic tape reader and is transmitted through the key box to the two corresponding stop relays. This must occur in each of the five channels before all ten stop relays may be simultaneously actuated to close the upper portion of the actuating circuit of FIG. 5 for the master stop relay R101. More particularly, the master stop relay cannot be actuated by reception of the proper signal on one, two, three or four of the five channels A through E, but only on reception of the proper signal by all five of these channels.

The complication mentioned above, regarding the proper actuation of the interrupting means in connection with the F channel are resolved by the relay contact network shown in the lower portion of FIG. 5. More particularly, the upper portion of the circuit of FIG. 5 leads to the lefthand contacts of Key Box F and from there to a network of contacts of the three F channel stop relays R261, R262 and R263. It will be appreciated that as any of the four switches of Key Box F is actuated, a selected pair of righthand contacts of the key box are closed to connect the circuity of FIG. 4, and a corresponding pair of lefthand contacts of the key box are closed to connect a selected branch of the network of FIG. 5 into the control circuit for the master stop relay.

Thus, if the No. 1 switch of Key Box F is closed, thereby to pass only that signal corresponding to energization of register relay R61, as determined by the righthand contacts of the No. 1 switch, the possible circuit for energizing the master stop relay R101 of FIG. 5 is limited to the upper branch of the relay contact network, as determined by the lefthand contacts of the No. 1 switch. Accordingly, if stop relay R261 alone has been energized (by closing of reader switch S61 of FIG. 4), a signal will pass through the upper branch of the relay contact network since normally open relay contact R261–1 will be closed and normally closed relay contacts R262–1 and R263–1 will remain closed.

If the No. 2 switch of Key Box F is closed, thereby to pass only that signal corresponding to energization of register relay R62, the possible circuit for energizing the master stop relay R101 is limited to the second branch of the relay contact network. Accordingly, if stop relay R262 alone has been energized (by closing of reader switch S62 of FIG. 4), a signal will pass through the second branch of the relay contact network since normally open relay contact R262–2 will be closed and normally closed relay contacts R261–2 and R263–2 will remain closed.

If the No. 3 switch of Key Box F is closed, thereby to pass only that signal corresponding to energization of register relay R263, the possible circuit for energizing the master stop relay R101 is limited to the third branch of the relay contact network. Accordingly, if stop relay R263 alone has been energized (by closing of reader switch S63 of FIG. 4), a signal will pass through the third branch of the relay contact network since normally open relay contact R263–3 will be closed and normally closed relay contacts R261–3 and R262–3 will remain closed.

If the No. 4 switch of Key Box F is closed, thereby to pass signals corresponding to energization of any or all of the three register relays R61, R62 and R63, the possible circuit for energizing the master stop relay R101 is limited to the lower branch of the relay contact network. If all three stop relays R261, R262 and R263 have been energized (by closing of all three reader switches S61, S62 and S63 of FIG. 4), a signal will pass through the lower branch of the relay contact network since all three normally open relay contacts R261–4, R262–4 and R263–4 will be closed.

It will now be seen that the stop relay contacts of the six channels are arranged in series such that each channel must receive the proper signal to which the key box of that channel was preset before operation of the master stop relay R101 can be obtained. Furthermore, the two stop relay contacts of each of the five channels A through E are arranged in series since these channels operate on the two-out-of-five signal system. In the case of the sixth or F channel, the signal system is essentially one-out-of-three, and therefore, calls for parallel arrangement of the contacts of the three stop relays. This is seen in essence in the normally open contacts R261–1, R262–2 and R263–3 of the relay contact network for channel F. The remainder of the relay contact network and the lefthand set of switches of Key Box F are required in order to permit the use of a fourth or three-out-of-three signal in the F channel. The series-parallel arrangement of relay contacts is such that presetting of Key Box F to correspond to any of the one-out-of-three signals conditions the corresponding one of the three upper branches of the relay network for actuation by reception of the corresponding signal from the reader. Presetting of Key Box F to correspond to the single three-out-of-three signal conditions the lower branch of the network for actuation by reception of the three-out-of-three signal.

It will now be seen that a data processing method and apparatus have been disclosed which permit the generation of a control signal in response to the recalling of specific predetermined data. In the illustrated application of the invention, the control signal is employed to stop the machine when the data on a given line of a perforated tape is sensed. This facilitates revision of taped information, by the method of copying an existing tape until the machine is stopped upon the sensing of the predetermined data on a line which is to be revised. The revised data may then be inserted on the new tape manually, after which the remainder of the existing tape may be copied.

In accordance with the preferred embodiment of the invention, a keyboard is employed to encode intelligence for recording on a tape perforating machine, and when a tape reader sends coded data to a tape perforator, the keyboard doubles as a presettable discriminating or filtering means to pass only that signal corresponding to the presetting of the keyboard.

Whereas the keyboard normally functions to encode intelligence by connecting two ground circuits to any two of five signal circuits, operation of the line stop relay R100 conditions the keyboard such that a data signal from the reader which corresponds to the presetting of the keyboard may pass through the keyboard, not to the encoding circuits, but to control circuits. With the help of the line stop relay R100, the keyboard alternatively may encode intelligence in data signals and may decode data signals and pass selected ones of such data signals as control signals to associated control circuitry.

It will be noted that novel and unusual circuitry has been employed to provide for these same functions in the special F channel.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. Data processing apparatus comprising data storing means, keyboard means for manual encoding of data for storage in said storing means, data sensing means connectable to said storing means for feeding prerecorded data to said storing means, means for interrupting operation of said data sensing means, and means for connecting said data sensing means to said interrupting means through said keyboard means, whereby said keyboard means may be preset to permit actuation of said interrupting means by said sensing means only when a data signal generated by said sensing means corresponds to the setting of said keyboard means.

2. Data processing apparatus comprising data storing means, keyboard means effective, through selective connection of alternatively connectable circuits, to encode multiple ordered data for storage in said storing means, data sensing means automatically operable to feed prerecorded data to said storing means, means for interrupting operation of said data sensing means, and means for connecting said data sensing means to said interrupting means through said keyboard means, whereby said keyboard means may be preset to permit actuation of said interrupting means by said sensing means only when a data signal generated by said sensing means corresponds to the setting of said keyboard means, said interrupting means including at least one interruption-controlling translating device for each order of said data, the translating devices for the various orders being arranged in series whereby each translating device must be operated by passage of a data signal by the corresponding order of said keyboard means before said interrupting means may be effective to interrupt operation of said data sensing means.

3. Data processing apparatus as specified in claim 2 wherein at least one of said orders employs a one-out-of-three system of data signals combined with a three-out-of-three system to provide four possible signals for that order, and wherein said interrupting means for such order includes three translating devices having controlled switch contacts so arranged in series-parallel combination that presetting of the associated encoding means to correspond to any one-out-of-three data signal conditions one of three partial circuits including series arranged translating device switch contacts for actuation by reception of the corresponding data signal, and presetting of the associated encoding means to correspond to the three-out-of-three signal conditions a fourth partial circuit including series arranged translating device switch contacts for actuation by reception of the three-out-of-three data signal.

References Cited in the file of this patent

UNITED STATES PATENTS

| | | |
|---|---|---|
| 2,179,712 | Burcky et al. | Nov. 14, 1939 |
| 2,431,646 | Kenney et al. | Nov. 25, 1947 |
| 2,682,573 | Hunt | June 29, 1954 |
| 2,737,342 | Nelson | Mar. 6, 1956 |

UNITED STATES PATENT OFFICE
CERTIFICATE OF CORRECTION

Patent No. 3,166,736 January 19, 1965

George L. Heminger

It is hereby certified that error appears in the above numbered patent requiring correction and that the said Letters Patent should read as corrected below.

Column 1, line 22, for "recoder" read -- reader --; line 36, strike out "a"; column 4, line 41, strike out "the", firs occurrence.

Signed and sealed this 24th day of August 1965.

(SEAL)
Attest:

ERNEST W. SWIDER
Attesting Officer

EDWARD J. BRENNER
Commissioner of Patents